US012020531B2

(12) United States Patent
Shaffer, Jr. et al.

(10) Patent No.: US 12,020,531 B2
(45) **Date of Patent: *Jun. 25, 2024**

(54) SLOT MACHINE WITH REEL-BASED PERSISTENCE-OF-VISION EFFECTS

(71) Applicant: Aristocrat Technologies, Inc., Las Vegas, NV (US)

(72) Inventors: Stephen Shaffer, Jr., Las Vegas, NV (US); Frank Rodriguez, Las Vegas, NV (US); Joseph Masinter, II, Las Vegas, NV (US); Alfred Thomas, Ventura, CA (US)

(73) Assignee: Aristocrat Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/204,841

(22) Filed: Jun. 1, 2023

(65) Prior Publication Data

US 2023/0306810 A1 Sep. 28, 2023

Related U.S. Application Data

(63) Continuation of application No. 17/491,162, filed on Sep. 30, 2021, now Pat. No. 11,710,369.

(Continued)

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC .. G07F 17/3213; G07F 17/3211; G07F 17/32; G07F 17/3265; G07F 17/3216; G07F 17/34; G07F 17/3227; G07F 17/3202
See application file for complete search history.

(56) References Cited

U.S. PATENT DOCUMENTS 6,517,433 B2 2/2003 Loose
8,118,674 B2 2/2012 Burak (Continued)

FOREIGN PATENT DOCUMENTS

CN 103062083 4/2013
CN 204628028 9/2015

OTHER PUBLICATIONS

Office Action (Non-Final Rejection) dated Oct. 24, 2022 for U.S. Appl. No. 17/491,162 (pp. 1-16).

(Continued)

*Primary Examiner* — Justin L Myhr
(74) *Attorney, Agent, or Firm* — Brownstein Hyatt Farber Schreck, LLP

(57) ABSTRACT

A gaming device in accordance with some implementations includes a housing, a reel-spin initiation member, and a reel configured to spin in response to a user actuation of the reel-spin initiation member, the reel including a peripheral member having a plurality of symbols thereon and an array of light-emitting elements coupled to the reel. The gaming device also includes a controller coupled to the array of light-emitting elements and configured to selectively illuminate respective light-emitting elements of the array of light-emitting elements while the reel is rotating to produce an animated visual element.

20 Claims, 17 Drawing Sheets

Related U.S. Application Data

(60) Provisional application No. 63/154,497, filed on Feb. 26, 2021.

(56) References Cited

U.S. PATENT DOCUMENTS

| | | | |
|---|---|---|---|
| 8,303,158 B2 | 11/2012 | Chien | |
| 8,342,938 B2 | 1/2013 | Paulsen | |
| 8,814,654 B2 | 8/2014 | Hoffman | |
| 10,593,148 B1 | 3/2020 | Rosander | |
| 11,030,847 B2 | 6/2021 | Rosander | |
| 2005/0037843 A1 | 2/2005 | Wells | |
| 2006/0128467 A1 | 6/2006 | Thomas | |
| 2007/0008600 A1 | 1/2007 | Okada | |
| 2007/0066389 A1 | 3/2007 | Kojima | |
| 2008/0305848 A1 | 12/2008 | Okada | |
| 2010/0048281 A1 | 2/2010 | Kearns | |
| 2014/0342796 A1 | 11/2014 | Fujisawa | |
| 2017/0053477 A1* | 2/2017 | Miller, Sr. | G07F 17/34 |
| 2019/0179028 A1 | 6/2019 | Pacala | |
| 2020/0090458 A1 | 3/2020 | Rosander | |

OTHER PUBLICATIONS

Office Action (Final Rejection) dated Feb. 2, 2023 for U.S. Appl. No. 17/491,162 (pp. 1-16).

Office Action (Notice of Allowance and Fees Due (PTOL-85)) dated Mar. 9, 2023 for U.S. Appl. No. 17/491,162 (pp. 1-8).

* cited by examiner

SLOT MACHINE WITH REEL-BASED PERSISTENCE-OF-VISION EFFECTS

CROSS-REFERENCE TO RELATED APPLICATION

This application is a continuation of U.S. patent application Ser. No. 17/491,162, filed Sep. 30, 2021, now U.S. Pat. No. 11,710,369, which is a nonprovisional and claims the benefit under 35 U.S.C. § 119(e) of U.S. Provisional Patent Application No. 63/154,497, filed Feb. 26, 2021, the contents of which are incorporated herein by reference as if fully disclosed herein.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

The instant application describes slot machines and methods of operating slot machines, in which a persistence of vision optical technique is used to produce images (e.g., static images, animations, or the like) directly on or over the slot machine's reels. Such images may be used, for example, to illustrate game play features, such as "wild" symbols, bonus game values, symbols that do not otherwise appear on the reels, or the like. The images may also provide visual elements that are informative (e.g., graphics, animations, etc.) or that otherwise increase the range and scope of user-interfaces that may be presented to a player.

In some cases, a slot machine in accordance with the instant disclosure includes a housing and a reel-spin initiation member, such as a lever, button, touch-screen, or the like. The slot machine may also include at least three reels (e.g., mechanical reels) that are configured to spin in response to a user actuation of the reel-spin initiation member. At least one of the reels may include a peripheral member having a plurality of symbols thereon. When the reels are stopped, the symbols that are visible may represent or indicate the outcome of the game. At least one of the reels, and in some cases all of the reels, may include an array of light-emitting elements coupled to the reel (or positioned above or inside the reel). A lighting controller may be coupled to the array of light-emitting elements and configured to selectively illuminate respective light-emitting elements of the array of light-emitting elements while the reel is rotating to produce an animated visual element. For example, the controller may cause the array of light-emitting elements to act as a "persistence of vision" display, such that images, optionally including video-style animations, may be shown to a user at the same position as the mechanical reels (e.g., directly over or otherwise coincident with the symbols on the mechanical reels).

DETAILED DESCRIPTION

Figure 1:
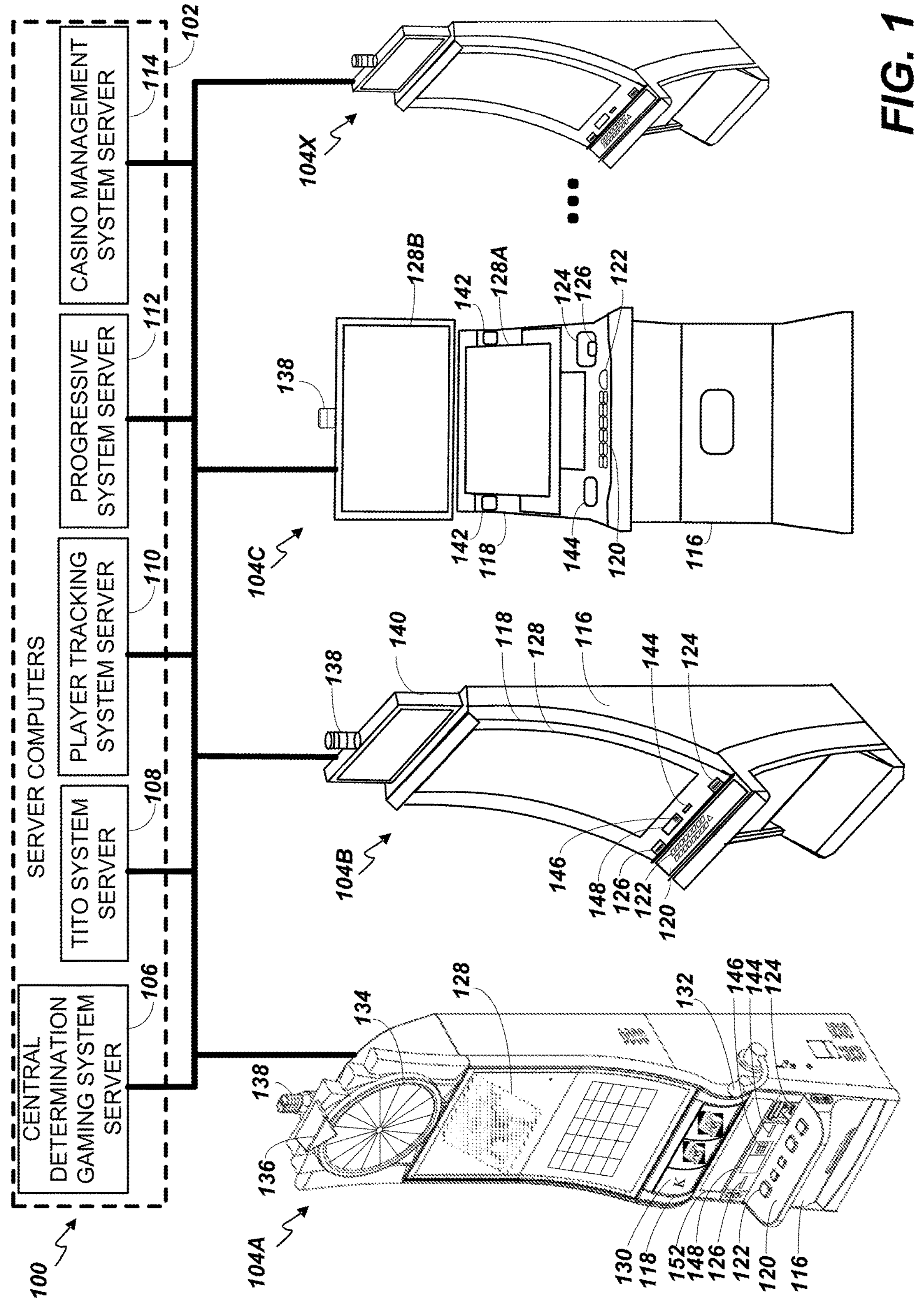
FIG. 1 is an exemplary diagram showing several EGMs networked with various gaming related servers.

Mechanical slot machines (or "reel machines") may include mechanical reels that spin or rotate in response to a reel-spin initiation input (e.g., pulling on a lever, pressing a button, etc.). When the reels stop, the particular arrangement of the symbols on the reels relative to "paylines" of the machine may indicate the outcome of the game. In some cases, instead of or in addition to spinning mechanical reels, slot machines may have displays (e.g., LED displays, OLED displays, LCD displays, etc.) that mimic the function and/or appearance of a mechanical reel. In some implementations, such displays are curved to appear more similar to mechanical reels, or may even be positioned on mechanical reels or other rotating structures. Video slot machines may include computer screens, touchscreens, or other dynamic displays, that show virtual reels or representations of reels. The dynamic displays of video slot machines may allow for more varied game play scenarios, animations, and the like. While the game play possibilities may be more variable with video slot machines, some players may prefer mechanical slot machines due to their more traditional look, feel, sound, and overall experience.

The instant application describes slot machines that use mechanical reels in conjunction with "persistence of vision" display techniques to produce dynamic visual elements that appear on or over the mechanical reels. Persistence of vision as used herein generally refers to techniques for producing images that rely on the phenomena in which a light source may appear visible to a person for a short time after the light source has been turned off. For example, in some implementations, if a set of lights is moved rapidly through a location in space and one of the lights is illuminated for a brief moment when that light is in a particular location, that light remains visible to a user for longer than the duration that the light is illuminated. In this way, the set of lights builds an entire image, pixel-by-pixel, across multiple passes through the location in space. The resulting image appears as though the pixels are all illuminated simultaneously, even though they are not. As a specific example, a strip of light-emitting diodes (LEDs) is spun rapidly so that it cyclically passes through a certain area. As the strip passes that area, the LEDs are illuminated or flashed to build an image pixel-by-pixel. The resulting image (which may be static, animated, etc.) may appear to be floating in space, as the strip of LEDs is moving sufficiently fast that the user does not visually perceive its presence. With respect to slot machines as described herein, arrays of light-emitting elements (also referred to simply as light arrays or arrays) are, in some implementations, attached to the mechanical reels of the slot machine. When the reels spin, the light arrays (e.g., individual light sources in the light arrays) are selectively illuminated according to a particular illumination pattern to produce a visual element such as an animation (which may include multiple different frames or cells), a reel symbol that is not present on the mechanical reel, a bonus indicator, or any other information or graphical content that may relate to the game play or expand the scope and type of information that can be presented to a user (or otherwise enhance the user experience).

Generally, visual elements produced using persistence of vision techniques may appear to be floating or holographic. In various implementations, the visual elements are static images, video-like animations, static or scrolling words, or the like. In the context of slot machines, persistence of vision techniques may be used to increase game play options, enhance user interface design, and/or enhance a player's understanding of obtaining certain game outcomes. In some implementations, persistence of vision techniques are used to produce virtual reel-spin animations that supplement the main mechanical reel-spin game play. In some implementations, for example, a game play option allows a player to earn or win a "bonus" reel spin that occurs after (or optionally during) the spinning of the mechanical reels. In one such example, the persistence of vision visual effects include an animation of a reel spin, including initially showing one (or more) reels in a static configuration (with symbols, which may be different from those of the mechanical reels), transitioning to a reel-spin animation that includes virtual reel motion (e.g., motion blur, etc.), and subsequently showing the reel(s) stopping to reveal the game outcome. Other types of information may also be displayed using the persistence of vision techniques, such as the player's remaining credit, the player's winnings during a session, game play instructions or options, or the like.

In some implementations, the light arrays for producing persistence of vision effects on a slot machine are positioned on the mechanical reels themselves. In some implementations, they are positioned on a separate rotating structure that can rotate independently of the mechanical reels. In the case of light arrays positioned on the mechanical reels, persistence of vision techniques are used to produce visual elements only when the reels are spinning. Where the light arrays are attached to separate rotating structures (also referred to herein as rotatable light structures), the visual elements may be displayed when the mechanical reels are spinning and/or when they are stopped.

In order to facilitate the production of visual elements using the rotatable light arrays, it may be advantageous to provide both electrical power and data to the structure that is rotating. Accordingly, in some implementations the slot machines described herein include wireless power and data transfer systems to provide reliable power and communications to and from the rotating structures. These and other features and details are described herein.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light-emitting diode (LED), or organic light-emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
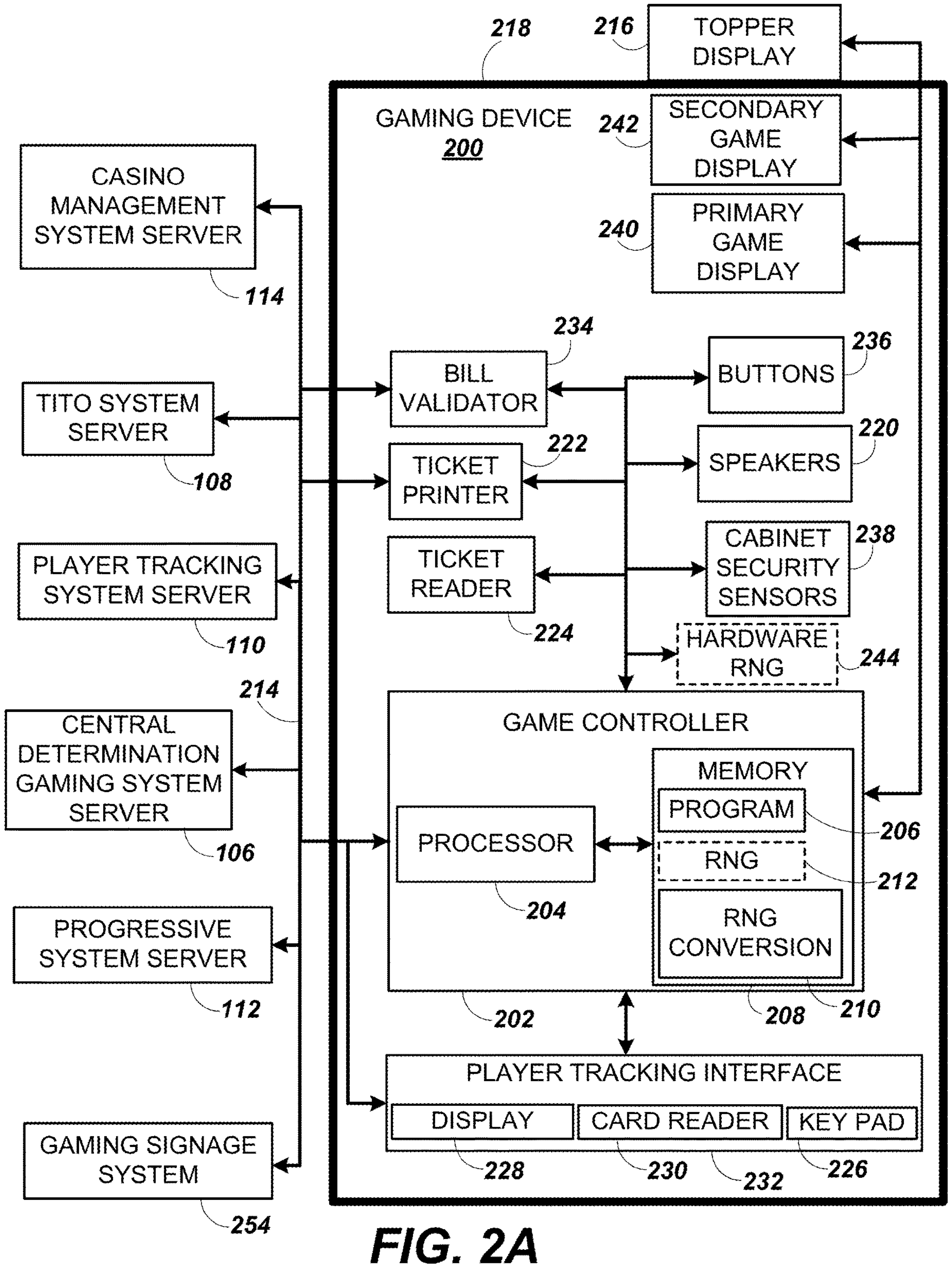
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes (e.g., random game outcomes) are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes (e.g., random game outcomes) for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
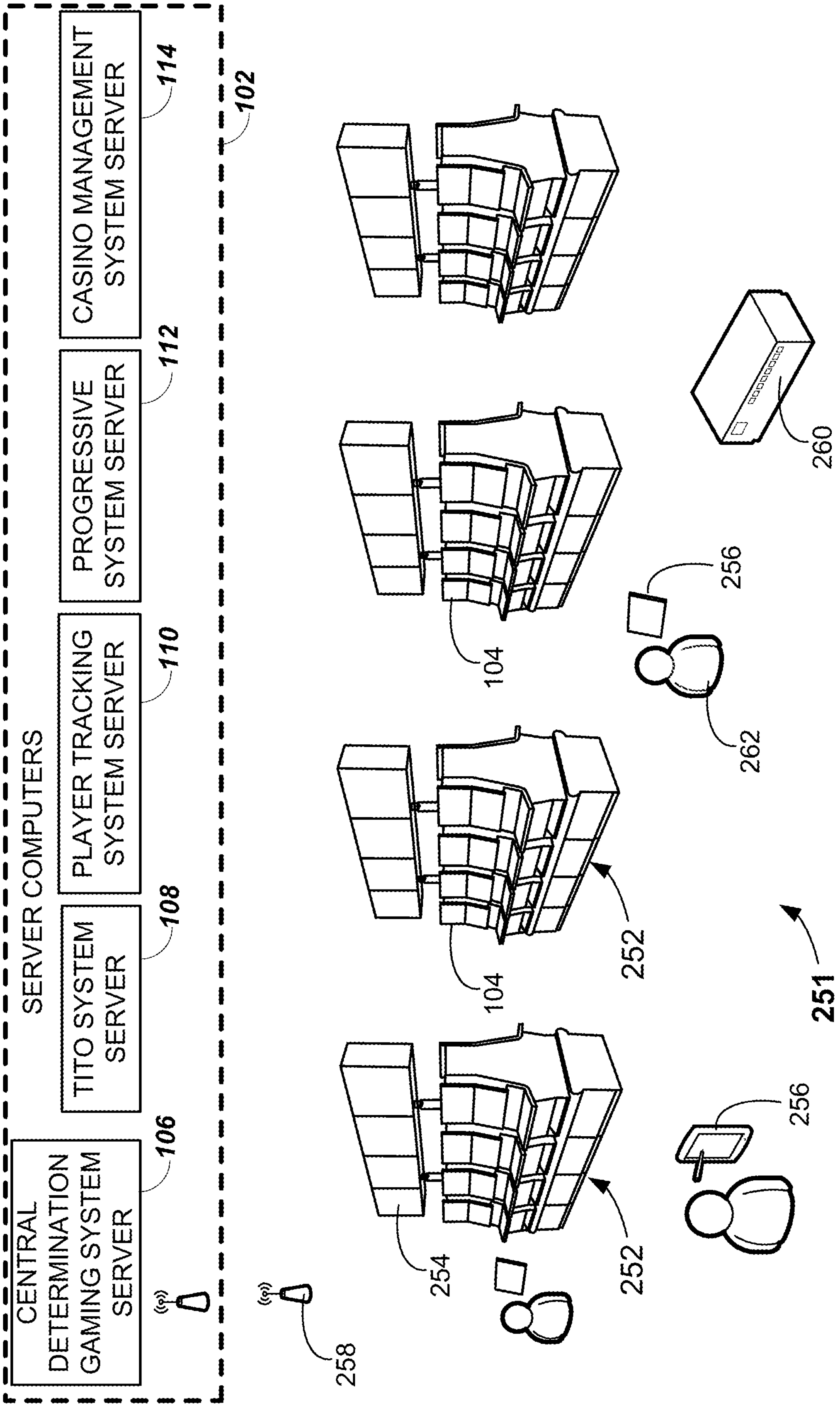
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a “cash out” signal to a kiosk 260 via a wireless link in response to receiving a “cash out” indication from a casino patron. The kiosk 260 may provide monetary credits to the casino patron 262 corresponding to the “cash out” signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
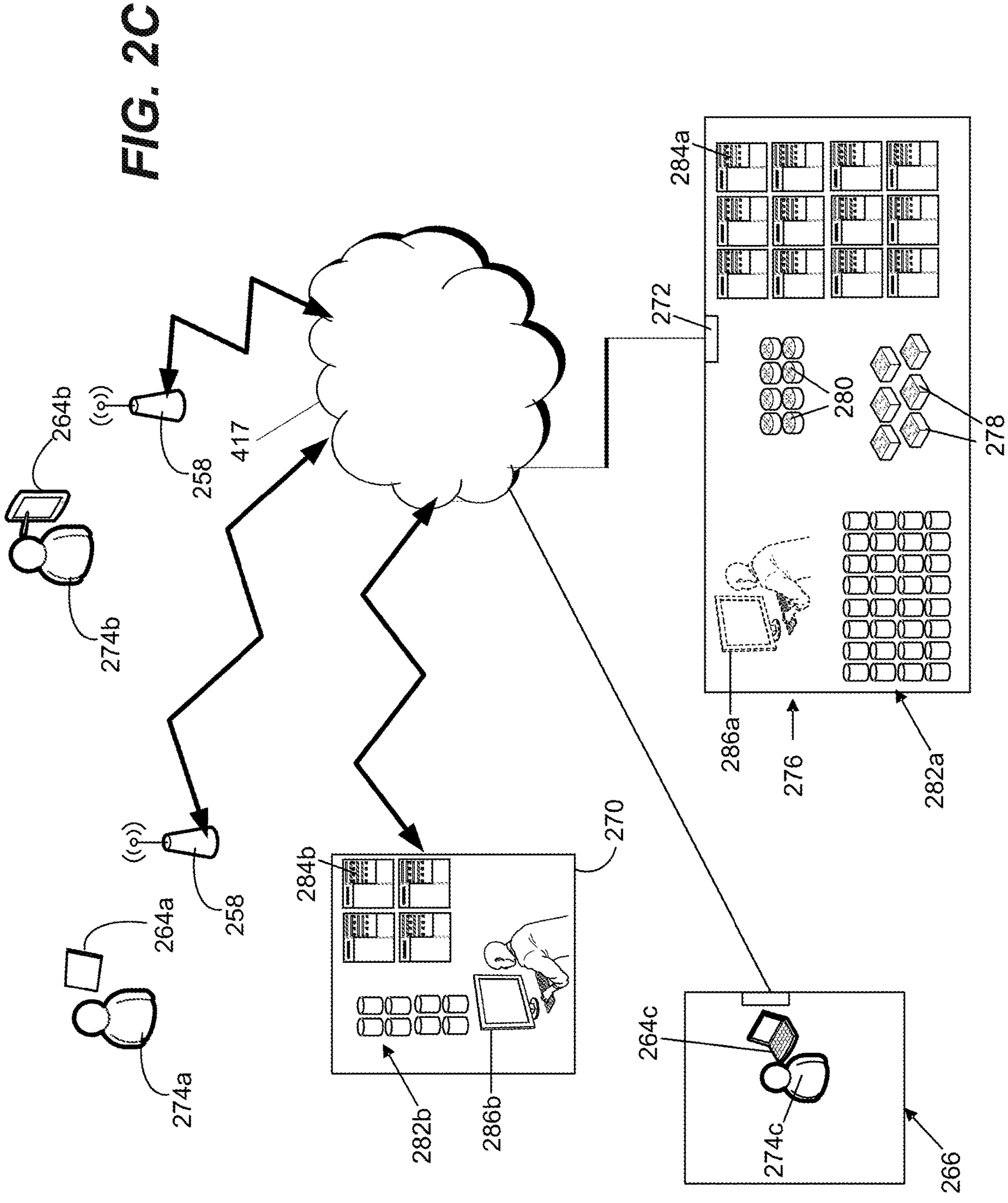
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) **264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2**C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices **282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276**.

In this example, a financial institution data center 270 is also configured for communication via the networks 417. Here, the financial institution data center 270 includes servers **284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270**.

According to some implementations, the gaming data center 276 may be configured to provide online wagering games in which money may be won or lost. According to some such implementations, one or more of the servers **284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's “cash in” selections, wagering game results and a player's “cash out” instructions. According to some such implementations, the server(s) 284*a* may be configured to electronically credit or debit the account of a player that is maintained by a financial institution, e.g., an account that is maintained via the financial institution data center 270. The server(s) 284***a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
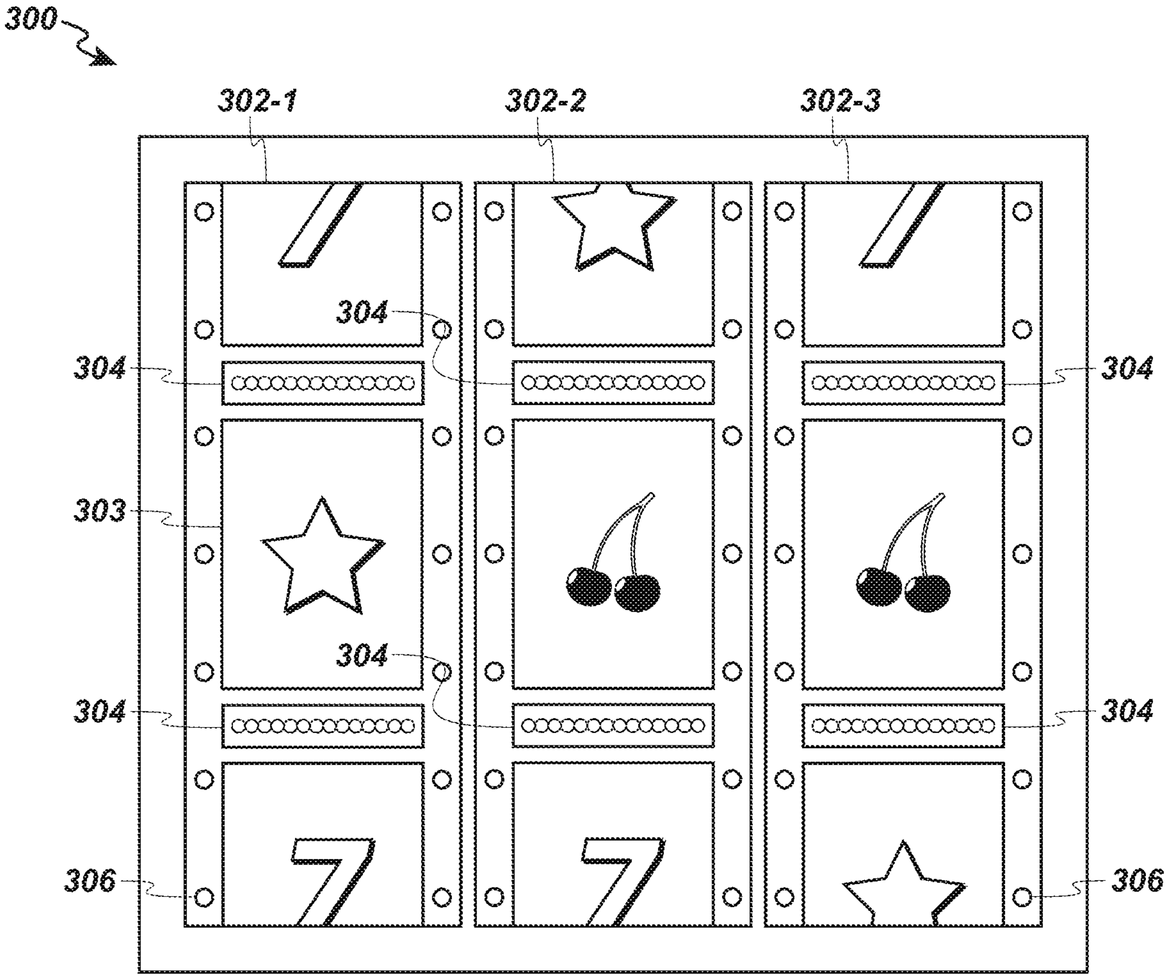
FIG. 3 depicts a portion of a slot machine with reels that include arrays of light-emitting elements, according to some aspects of the present disclosure.

FIG. 3 depicts a portion of a slot machine 300 with a set of reels 302 (302-1, 302-2, 302-3). While only three reels 302 are shown, more or fewer reels are used (e.g., 2 reels, 4 reels, 5 reels, or the like) in various implementations. The reels are configured to spin response to a user actuation of a reel-spin initiation member, such as a mechanical lever attached to the slot machine, a "spin" button (either a physical button or a touch-screen style button), or the like. In some implementations, each reel includes a peripheral member with a plurality of symbols thereon (e.g., the symbol 303). The peripheral member may be a tape-like material that wraps around a structure of the reel. The position of the symbols when the reels 302 have all ceased spinning (relative to paylines of the slot machine) indicates the outcome of the game.

In some implementations, the reels 302 each include one or more arrays 304 of light-emitting elements coupled thereto (also referred to as light arrays 304), for producing images using persistence of vision optical techniques. As described above, the arrays 304 produce images by selectively illuminating or "flashing" individual light-emitting elements while the reels 302 are being spun. The "flashes" of light persist in a user's vision such that, over multiple spins of the reels 302, an entire image can be perceived, even though each individual "flash" is not necessarily occurring simultaneously. Stated another way, as long as all of the "flashes" occur within a certain time window and/or rotational position of the reels, they may appear to a user to be present at the same time (even though each individual flash may be produced at a separate time).

In some implementations, an array of light emitting elements includes one or more rows of light emitting elements, such as LEDs, OLEDs, incandescent light sources, or the like. In some implementations, the light emitting elements in an array have a substantially uniform height, while in other implementations the light emitting elements have differing heights. An example in which light emitting elements of an array have different heights is described with reference to FIGS. 11A-11C. In some implementations, the arrays have a length (e.g., a longest dimension) that is equal to or greater than a width of a reel basket (or reel peripheral member) with which the array is associated and/or coupled to. In some implementations, the arrays have a length that is smaller than the width of a reel basket. In some implementations, the arrays have a length that is substantially equal to the width of a symbol on a reel. FIG. 3 illustrates an example in which the arrays 304 have a length that is substantially equal to a width of the symbols 303 on the reels 302. Other lengths are also contemplated (e.g., arrays with lengths that are shorter than the width of a reel and/or a symbol). Further, while FIG. 3 illustrates an example in which the arrays 304 include a single row of a particular number of light emitting elements, in other examples, the arrays have more rows and/or more or fewer light emitting elements in each row. In some implementations, an array of light emitting elements is a pixelated display, such as an LCD display, OLED display, or the like.

Figure 7:
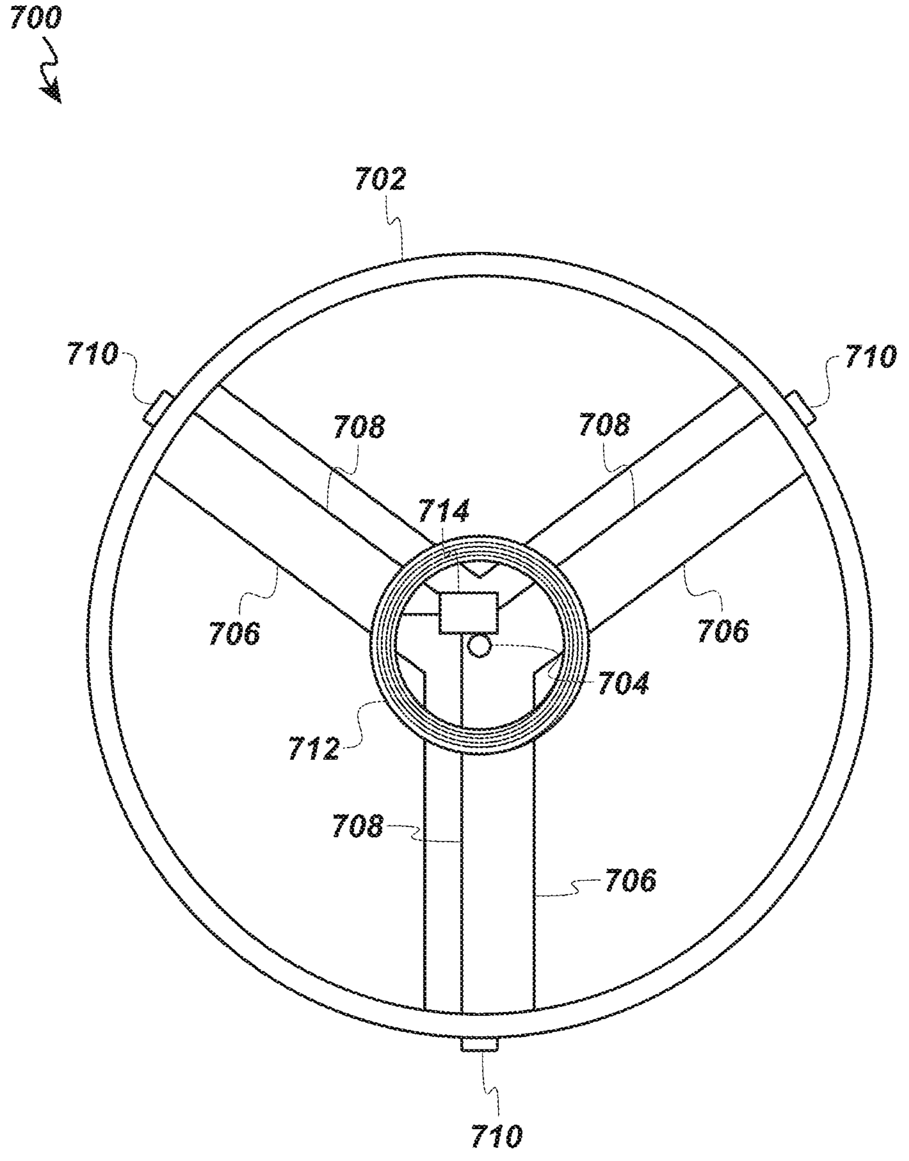
FIG. 7 depicts an example reel with arrays of light-emitting elements, according to some aspects of the present disclosure.

The reels 302 may have any suitable number of arrays 304, such as one, two, three, four, or more arrays 304. While FIG. 3 illustrates an array 304 between each symbol 303, this is merely for illustration. For example, FIG. 7 illustrates an example reel 700 with three arrays (e.g., arrays 710) distributed evenly around the reel (e.g., at 120-degree intervals). In some implementations, the number of arrays 304 and their positioning on a given reel (or separate rotatable light structure) is based on or otherwise corresponds to the rotational speed of the reel (or rotatable light structure). In some cases, reels or rotatable light structures that rotate at higher rates of rotation are capable of producing persistence of vision visual elements with fewer light arrays, as compared to reels or rotatable light structures that rotate at lower rates of rotation.

In some implementations, a light-emitting element corresponds to an individually controllable region of an array, such as a single light-emitting diode, a pixel, a region of a display (e.g., an LED display, an OLED display), or the like. In some cases, the arrays 304 include one or more rows of discrete LEDs or any other suitable light emitting element, as shown in FIG. 3. In some cases, the reels 302 also include auxiliary light-emitting elements (e.g., light-emitting element 306) positioned at other locations on the reels 302 (e.g., circumferentially around the reel and along an edge or side of the reel). In some cases, the auxiliary light-emitting elements 306 are used in conjunction with the arrays 304 to produce visual elements using persistence of vision techniques; in other cases they are used separately to provide other optical and/or graphical effects (e.g., flashing effects, scrolling-marquee style effects, etc.). The light-emitting elements of the arrays 304, as well as the auxiliary light-emitting elements 306, may produce one color (e.g., single color LEDs) or multiple colors (e.g., tri-color LEDs).

Figure 4:
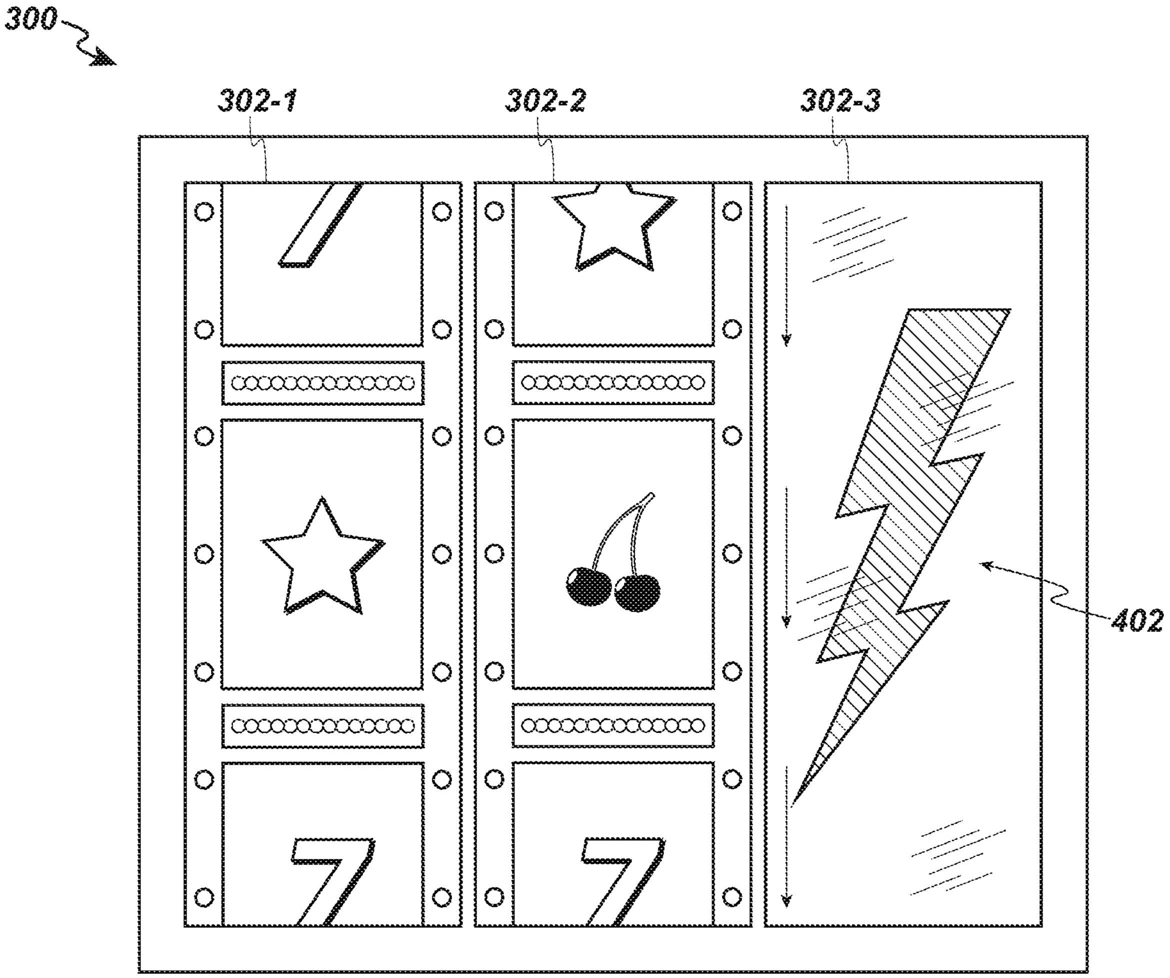
FIG. 4 depicts the slot machine of FIG. 3 while producing a visual element using a persistence of vision optical technique.

In some implementations, the slot machine 300 has one or more controllers (e.g., the controller 1306, FIG. 13) coupled to the arrays 304 and configured to selectively illuminate respective light-emitting elements of the arrays 304 while the reels are rotating to produce a visual element that appears in the user-facing location of the reels 302. FIG. 4 illustrates the slot machine 300 with reels 302-1 and 302-2 stationary (e.g., after they ceased spinning during a game play operation and are presenting a game outcome), and the reel 302-3 rotating about a rotation axis of the reel 302-3. While the reel 302-3 is rotating as shown, light-emitting elements of the arrays 304 (or optionally a single array) that are coupled to the reel 302-3 are selectively illuminated to produce at least a portion of the desired visual element (the lightning bolt) using persistence of vision techniques.

As noted above, the visual elements are produced using a persistence of vision optical technique. For example, as an array 304 reaches a particular position in the user-viewable area of the slot machine 300 (corresponding to a first rotational position of the reel), the array 304 is illuminated according to a first illumination pattern that corresponds to a portion of the visual element (e.g., a portion of a single frame of an animation, such as a set of pixels associated with a single frame of an animation). As the reel continues to rotate, the array moves to another position in the user-viewable area of the slot machine 300 (corresponding to a second rotational position of the reel, different from the first rotational position, but optionally within a single rotation of the reel), and consequently transitions from the first illumination pattern to a second illumination pattern (e.g., it ceases to display the first illumination pattern and instead displays a second, different illumination pattern, such as a different set of pixels). The second illumination pattern corresponds to another portion of the visual element (e.g., a second or different portion (e.g., a different set of pixels) of the single frame of animation). This process continues as the reel 302-3 (and thus the array 304) rotates about the axis, such that as the array 304 reaches particular positions, it displays a corresponding portion of the visual element. Each time an array passes through a particular location, the particular illumination pattern may be the same or different. If, for example, a static image is to be displayed for a certain duration (e.g., 5 seconds), the illumination pattern of an array may be the same each time that array occupies a given position during that duration. If an animation is to be displayed (e.g., a 5 second animation of a moving object), the illumination pattern of an array may be different each time that array occupies a given position, corresponding to the different pixel patterns of the different "frames" of the animation.

If the reel 302-3 rotates at a sufficiently high speed, a user will not perceive the illuminated light sources of the array 304 individually, but instead will perceive a visual element that is the sum of the individual illumination patterns. In this way, the array 304 (or arrays 304) produces visual elements that are larger than any single array. As shown in FIG. 4, for example, the light array or light arrays 304 associated with the reel 302-3 are being illuminated according to different illumination patterns, at different rotational locations, to produce a graphic 402 of a lightning bolt. As used herein, an illumination pattern does not require all of the light-emitting elements to be active and/or to produce light. Rather, an illumination pattern may include some light-emitting elements active (e.g., producing light) and some light-emitting elements inactive (e.g., not illuminated or otherwise not producing light). In some cases, producing a visual element using persistence of vision optical techniques may include some instances in which no light-emitting elements are active or producing light.

Figure 5:
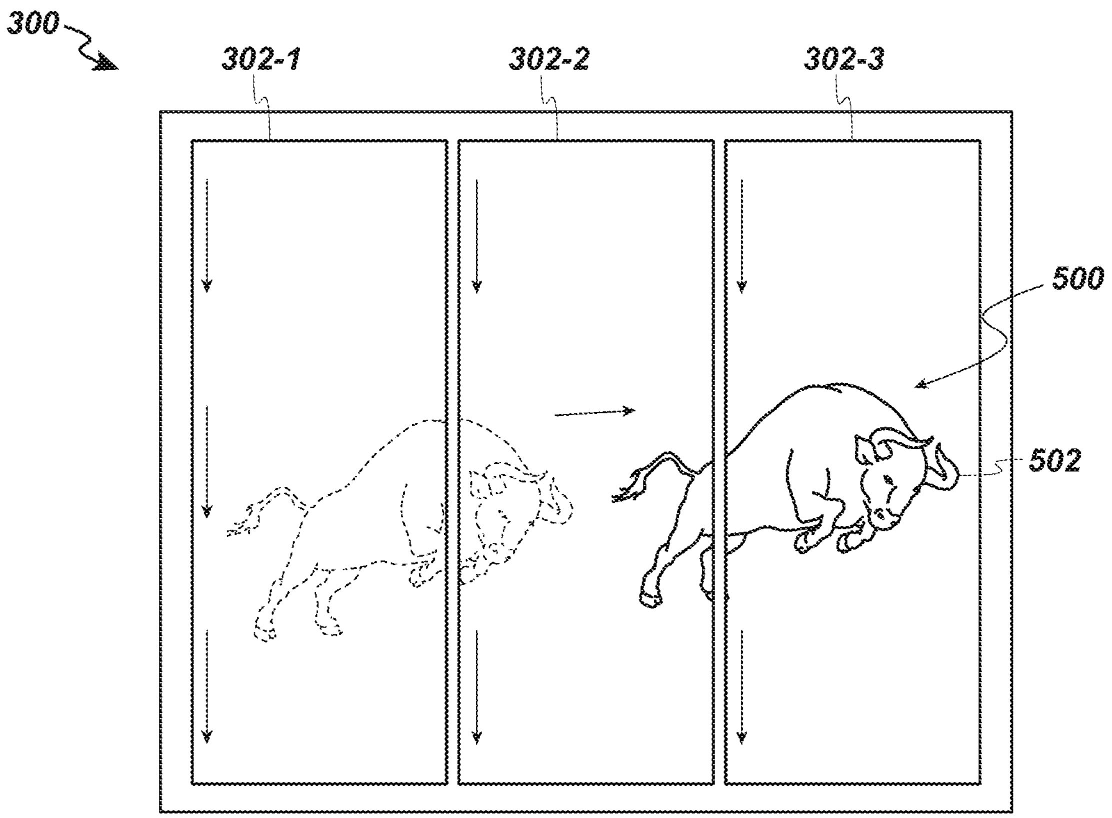
FIG. 5 depicts the slot machine of FIG. 3 while producing an animated visual element using a persistence of vision optical technique.

In some implementations, persistence of vision optical techniques are also used to produce animations (e.g., video-like moving images). FIG. 5, for example, illustrates the slot machine 300 displaying an animation 500, including an animated visual element 502, using the light arrays on the reels 302. The animation 500 may be displayed on multiple reels 302, as shown in FIG. 5, or on a single reel. In some cases, a reel can produce all or only a portion of (e.g., less than all of) a visual element. In FIG. 5, for example, at certain times of the animation, one of the reels (e.g., reel 302-2) depicts a first portion of the visual element 502, while another reel (e.g., reel 302-3) depicts another portion of the visual element 502. In some cases, different animations appear on different reels (e.g., each of at least two different reels display their own animation that is not coordinated with or otherwise illustrating a common scene or animated visual element as another reel). In some cases, some reels may produce animations while others produce static images or no images. Animation effects can move in any direction along an individual reel (e.g., a reel-spin animation of a single reel being produced by the arrays on a single reel, with symbols moving vertically along the reel) or among multiple reels (e.g., the animation 500 shown in FIG. 5, with a visual element 502 moving across multiple reels in a generally horizontal direction).

The animation(s) (and associated animated visual elements) that are produced by the light arrays may convey various types of information. In some implementations, the animation(s) include outcome UIs or game play UIs or are outcome UIs or game play UIs (e.g., bonus games, auxiliary games, or part of a main game play UI). In some implementations, the animation(s) convey information such as a bonus value (which may change over time), a jackpot or other payout amount, or the like. In some implementations, the animation(s) relate to a theme, title, or subject of the slot machine. In some implementations, the animation(s) are reel-spin animations. For example, in some cases, a user is presented with an opportunity to spin a set of virtual reels (e.g., as a bonus game or the like). In such cases, the reels or other rotatable light structure(s) spin and the light arrays are operated to produce a reel-spin animation (as well as static reel displays and any other visual elements that further the game and/or the game play experience). In some implementations, the reel-spin animation displays symbols other than those on the physical reel. In some implementations, other types of game play are provided using the animations, such as game play other than slot machine game play (e.g., virtual card games, virtual racing bet games, etc.).

The visual elements produced by light arrays that are positioned on or above the reels are configured to be positioned (or perceived as being positioned) between the user and a reel. For example, the visual element 402 (FIG. 4) and/or the visual element 502 (FIG. 5) may appear to be between a reel peripheral member (e.g., the reel peripheral member 702, FIG. 7) and the user (or between the reel peripheral member 702 and a display window of a slot machine). Even in examples where the light arrays are mounted on a reel and are substantially flush with the surface of the reel, because the reel is spinning rapidly, the static symbols on the reel are not typically visible during a reel spin. Accordingly, the visual elements produced by the light arrays may appear to be between the player and the reel (or otherwise independent of the reel).

Figure 6:
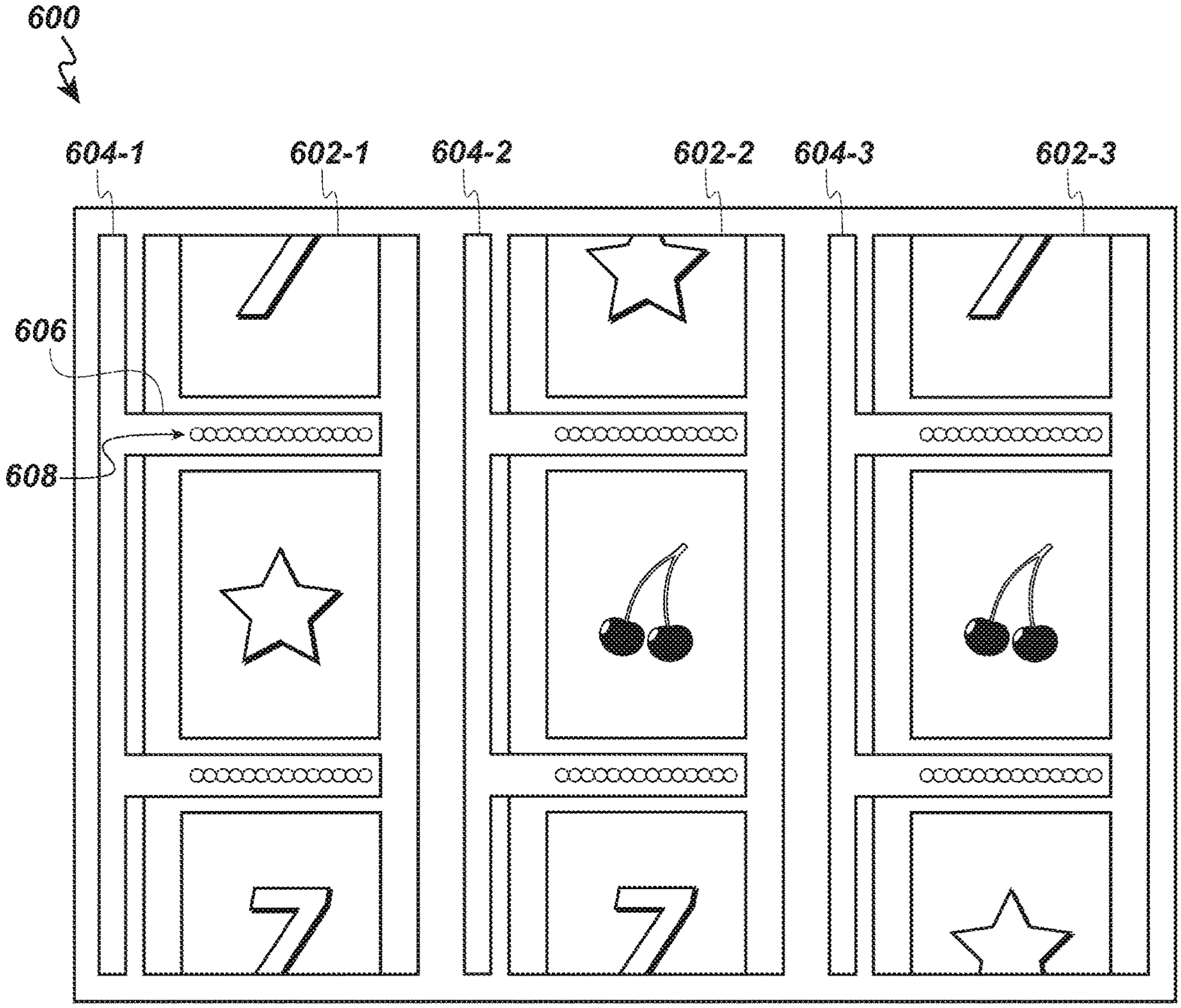
FIG. 6 depicts a portion of a slot machine with rotatable light structures that include arrays of light-emitting elements, according to some aspects of the present disclosure.
Figure 8:
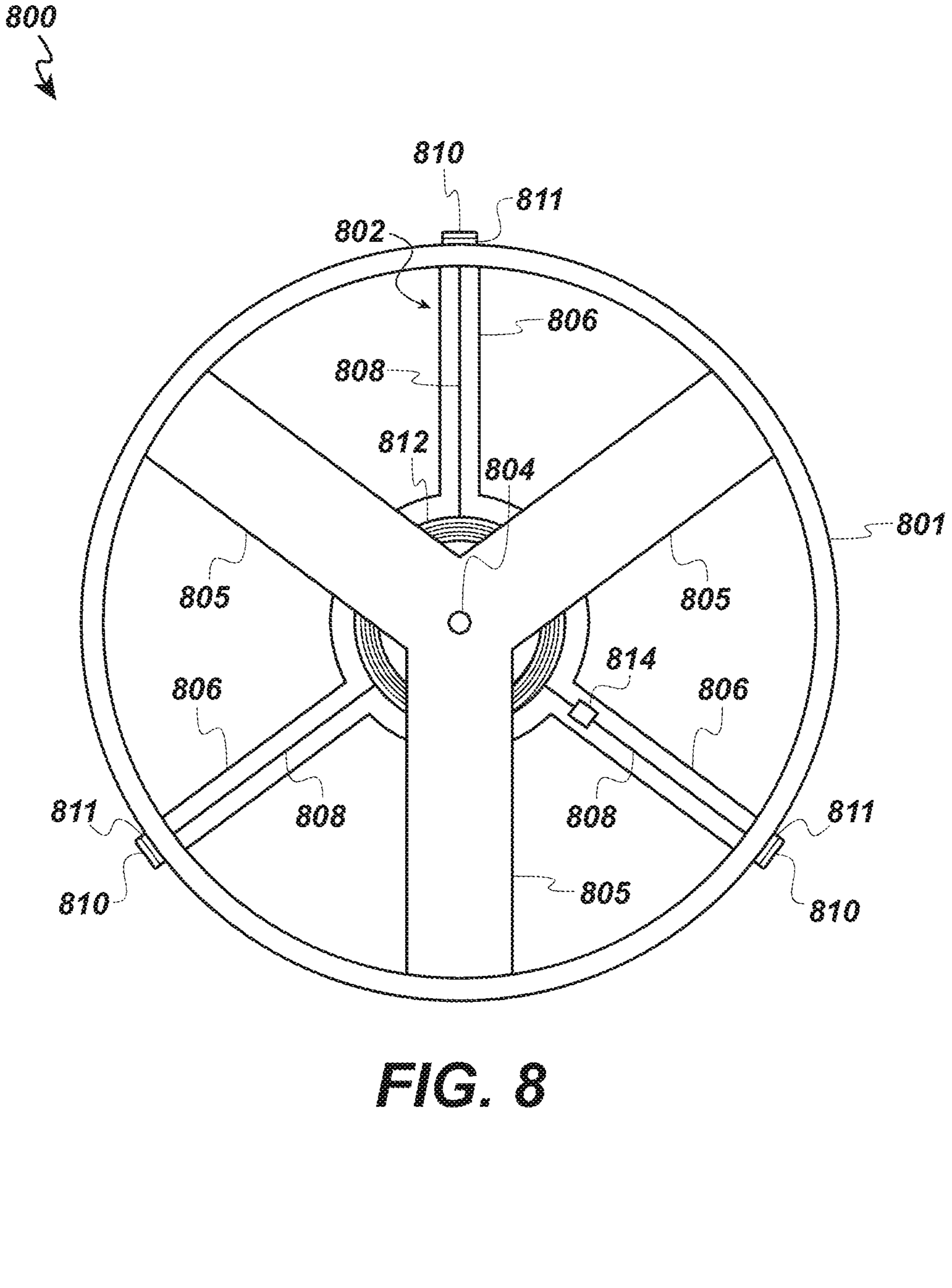
FIG. 8 depicts an example reel and a rotatable light structure that includes arrays of light-emitting elements, according to some aspects of the present disclosure.
Figure 10:
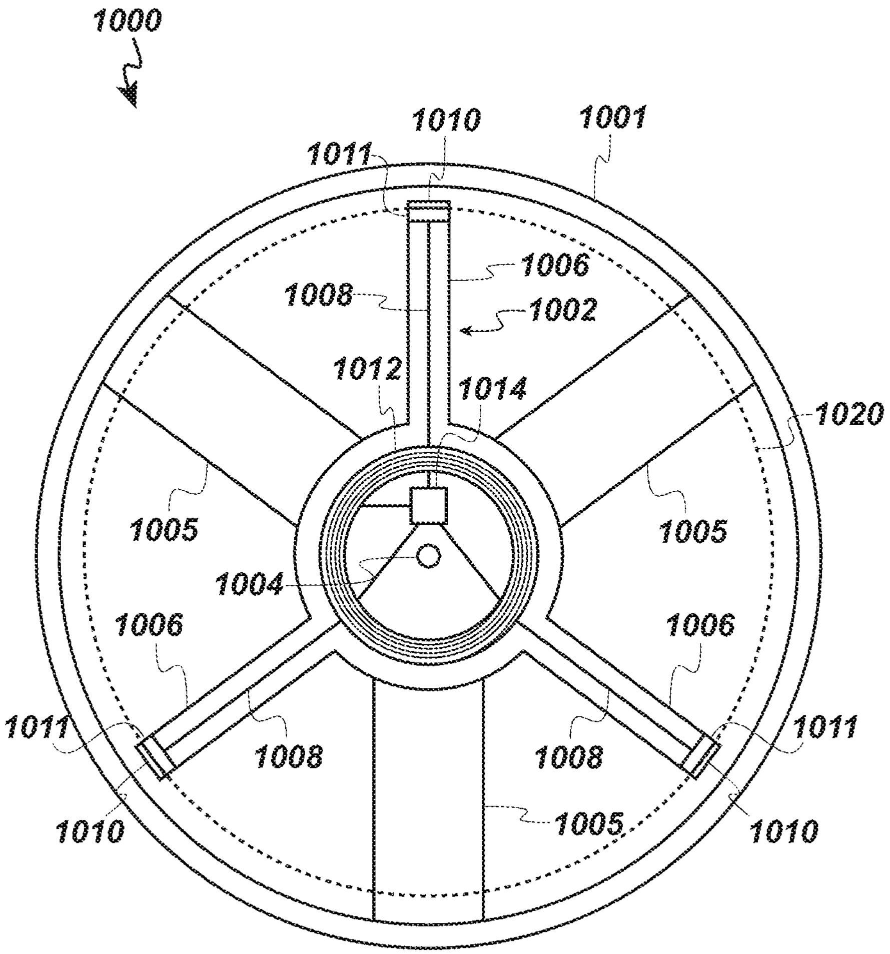
FIG. 10 depicts another example reel and a rotatable light structure that includes arrays of light-emitting elements, according to some aspects of the present disclosure.

In some cases, light arrays are mounted to a rotatable light structure that is configured to rotate independently of the reels of the slot machine, but rotate about the same axis as the reels. FIG. 6, for example, illustrates a slot machine 600 (which may be an implementation of the slot machine 300 and/or have the same and/or similar components, systems, functions, etc., as the slot machine 300). The slot machine 600 includes reels 602 (e.g., 602-1, 602-2, 602-3), which include reel peripheral members (e.g., a tape or other outer peripheral member, for example, the reel peripheral member 801 in FIG. 8) with symbols thereon. The reels 602 are configured to spin in response to a user actuation of a reel-spin initiation member. The slot machine 600 also includes rotatable light structures 604 (e.g., 604-1, 604-2, 604-3) that are configured to rotate about the same axis as the reels 602, but independently of the reels 602. In some implementations, the rotatable light structures 604 include auxiliary peripheral members (e.g., the auxiliary peripheral member 606) that are set apart from the reel peripheral members by a distance (e.g., between about 1 mm and about 10 mm). In some implementations, the auxiliary peripheral members are in front of and/or above the outer surface of the reel peripheral members (as shown in FIG. 8). In other implementations, the auxiliary peripheral members are behind the reel peripheral members (e.g., inside the reels 602, as shown in FIG. 10).

The rotatable light structure also includes arrays 608 of light-emitting elements (also referred to as light arrays 608). The light arrays 608 may be implementations of the light arrays 304 (FIG. 3) and/or have the same and/or similar components, systems, functions, etc., as the light arrays 304. The slot machine 600 also includes a controller that is coupled to the light arrays 608 and configured to selectively illuminate respective light-emitting elements of the arrays 608 while the rotatable light structures 604 are rotating about their axes to produce a visual output (for example, a graphic 402 (FIG. 4), and/or an animated visual element 502 of an animation 500 (FIG. 5)).

Because the rotatable light structures 604 can rotate independently of the reels, visual elements such as graphics, animations, etc., can be produced by the rotatable light structures 604 regardless of whether or not the underlying reel is spinning. Thus, the rotatable light structures 604 can display animations before a reel spin (e.g., prior to a reel spin initiating), during a reel spin, or after a reel spin (and/or across multiple of those time windows, such as before and during a reel spin). As one example, a user may earn a "bonus spin" to be completed after the main spin has been completed. The bonus spin may be presented using persistence of vision optical techniques (using the light arrays 608 of the rotatable light structures 604). For example, the rotatable light structures 604 may produce animations that look like or represent physical slot machine reels, including symbols that appear to spin and ultimately stop in a particular arrangement. Such animations (which may be referred to as virtual reels) optionally include different symbols than those on the physical reels 602. In some cases, the animation (e.g., an animated visual element) may be displayed prior to the underlying reels stopping to present a game outcome.

FIG. 7 illustrates an example reel 700. The reel 700 includes a reel peripheral member 702, which includes symbols thereon. The reel 700 further includes a support structure (e.g., spokes 706) that supports the reel peripheral member 702 and facilitates rotation of the reel about an axis 704. The reel 700 also includes arrays of light-emitting elements 710 coupled thereto (e.g., coupled to the reel peripheral member 702 or other structure of the reel 700).

In some implementations, a slot machine as described herein includes a wireless power transfer system configured to wirelessly provide power to the reel (e.g., for controlling and illuminating the light-emitting elements of the arrays 710). In some implementations, the reel 700 includes a receiver 712 coupled to the reel 700, as well as a transmitter coupled to a non-rotating structure of the slot machine. The wireless power transfer system provides electrical power for the arrays 710 (via conductors 708), as well as for a controller 714. In some implementations, the controller 714 includes components such as a processor, memory, wireless communication systems, and other electrical and/or circuit elements for providing the functions of the controller 714. In some implementations, the controller 714 is configured to receive information from the slot machine and/or any other suitable device or system, including information about when to display visual elements via the light arrays 710, what visual elements to display, etc. In some implementations, the controller 714 also controls the light arrays 710 (e.g., via conductors 708) to cause the light-emitting elements to be selectively illuminated, during rotation of the reel 700, to produce the desired visual element (e.g., graphic, animated visual element, etc.).

FIG. 8 illustrates an example in which a reel 800 is used in conjunction with an independently rotatable light structure 802. The reel 800 includes a reel peripheral member 801, which may include symbols thereon. The reel 800 further includes a support structure (e.g., spokes 805) that supports the reel peripheral member 801 and facilitates rotation of the reel about an axis 804.

The rotatable light structure 802 is configured to rotate about the axis 804, but independently from the reel 800. Accordingly, the rotatable light structure 802 may be capable of rotating both while the reel 800 is stationary, and while the reel 800 is rotating. The rotatable light structure 802 includes auxiliary peripheral members 811 (which may be or be implementations of the auxiliary peripheral members 606), and an auxiliary support structure (e.g., spokes 806) that supports the auxiliary peripheral members 811 and facilitates rotation of the rotatable light structure about the axis 804 (e.g., multiple full rotations of the rotatable light structure about the axis 804). The rotatable light structure 802 also includes arrays of light-emitting elements 810 coupled to the auxiliary peripheral members 811. As shown in FIG. 8, the auxiliary peripheral members 811 and the arrays 810 are positioned outside of the reel peripheral member 801 (e.g., the arrays 810 are "above" the reel, and/or between the reel 800 and a user of the slot machine).

In some implementations, a slot machine as described herein includes a wireless power transfer system configured to wirelessly provide power to the rotatable light structure 802 (e.g., for controlling and illuminating the light-emitting elements of the arrays 810). In such cases, the rotatable light structure 802 includes a receiver 812 coupled to the rotatable light structure 802, as well as a transmitter coupled to a non-rotating part of the slot machine. The wireless power transfer system provides electrical power for the arrays 810 (via conductors 808), as well as for a controller 814.

In some implementations, the controller 814 includes components such as a processor, memory, wireless communication systems, and other electrical and/or circuit elements for providing the functions of the controller 814. The controller 814 is configured to receive information from the slot machine and/or any other suitable device or system, including information about when to display visual elements via the light arrays 810, what visual elements to display, etc. The controller 814 also controls the light arrays 810 (e.g., via conductors 808) to cause the light-emitting elements to be selectively illuminated, during rotation of the rotatable light structure 802, to produce the desired visual element (e.g., graphic, animated visual element, etc.).

Figure 9:
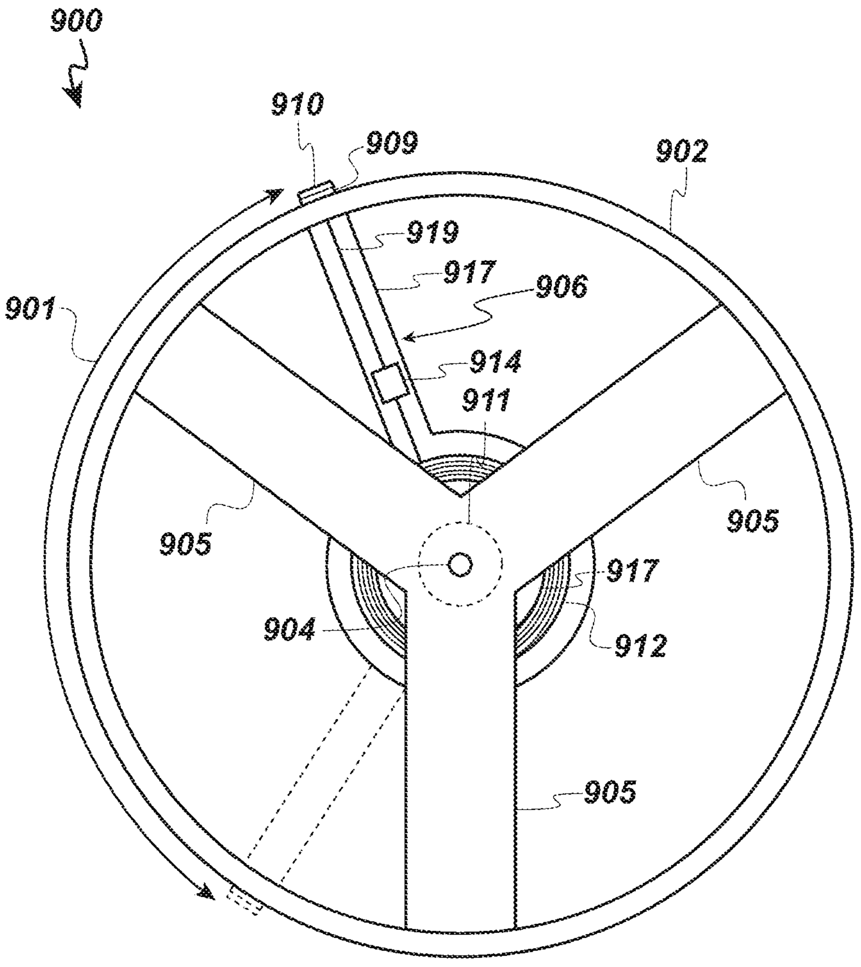
FIG. 9 depicts another example reel and a rotatable light structure that includes arrays of light-emitting elements, according to some aspects of the present disclosure.

FIG. 9. illustrates an example in which a reel 900 is used in conjunction with an independently rotatable light structure 906. The reel 900 includes a reel peripheral member 902, which may include symbols thereon. The reel 900 further includes a support structure (e.g., spokes 905) that supports the reel peripheral member 902 and facilitates rotation of the reel about an axis 904.

The rotatable light structure 906 is configured to rotate about the axis 904, but independently from the reel 900. More particularly, the rotatable light structure 906 is configured to oscillate through an arc 901 that is less than a full rotation about the axis 904. The rotatable light structure 906 includes an auxiliary peripheral member 909, and an auxiliary support structure (e.g., spoke 917) that supports the auxiliary peripheral member 909 and facilitates rotation (e.g., an oscillation) of the rotatable light structure 906 about the axis 904. The rotatable light structure 906 also includes an array of light-emitting elements 910 coupled to the auxiliary peripheral member 909.

In some implementations, a slot machine as described herein includes a wireless power transfer system configured to wirelessly provide power to the rotatable light structure 906 (e.g., for controlling and illuminating the light-emitting elements of the arrays 910). In such cases, the rotatable light structure 906 includes a receiver 912 coupled to the rotatable light structure 906, as well as a transmitter coupled to a non-rotating part of the slot machine. The wireless power transfer system provides electrical power for the arrays 910 (via conductors 919), as well as for a controller 914.

In some implementations, the controller 914 includes components such as a processor, memory, wireless communication systems, and other electrical and/or circuit elements for providing the functions of the controller 914. The controller 914 is configured to receive information from the slot machine and/or any other suitable device or system, including information about when to display visual elements via the light arrays 910, what visual elements to display, etc. The controller 914 also controls the light arrays 910 (e.g., via conductors 919) to cause the light-emitting elements to be selectively illuminated, during rotation of the rotatable light structure 906, to produce the desired visual element (e.g., graphic, animated visual element, etc.). In some implementations, the rotatable light structure 906 also includes a galvanometer 911 (or other suitable motor or actuator) that is configured to oscillate the rotatable light structure 906 through the arc 901.

FIG. 10. illustrates an example in which a reel 1000 is used in conjunction with an independently rotatable light structure 1002. The reel 1000 includes a reel peripheral member 1001, which may include symbols thereon. The reel 1000 further includes a support structure (e.g., spokes 1005) that supports the reel peripheral member 1001 and facilitates rotation of the reel about an axis 1004.

The rotatable light structure 1002 is configured to rotate about the axis 1004, but independently from the reel 1000. In some implementations, the rotatable light structure 1002 includes auxiliary peripheral members 1011, and an auxiliary support structure (e.g., spokes 1006) that supports the auxiliary peripheral members 1011 and facilitates rotation of the rotatable light structure about the axis 1004 (e.g., multiple full rotations of the rotatable light structure about the axis 1004).

As shown in FIG. 10, the auxiliary peripheral members 1011 and the arrays 1010 are positioned inside of the reel peripheral member 1001 (e.g., the arrays 1010 are "below" or "behind" the reel peripheral member 1001). In such cases, the reel peripheral member 1001 has optical properties that allow visual elements displayed by the arrays 1010 (including, e.g., images, animations, etc.) to be visible to a user of the slot machine. In some cases, the reel peripheral member 1001 appears to be opaque when the arrays 1010 are not illuminated (e.g., the light arrays 1010 and/or other objects behind the reel peripheral member 1001 are not visible to a user), and appears at least translucent when the arrays 1010 are illuminated (e.g., to produce an image, animation, or other visual element). Accordingly, when the arrays 1010 are producing a visual element, the visual element may be visible through the reel peripheral member 1001. In some cases, the reel peripheral member 1001 includes one or more windows (e.g., empty areas or transparent areas). In such cases, the reel 1000 may be configured to stop with a window in a viewable position relative to the user when the rotatable light structure 1002 is actuated to produce a visual element. For example, when an animation or other visual element is to be provided, the reel 1000 rotates to position the window in a viewable position, and then stops rotating while the rotatable light structure 1002 produces the visual element (which is viewed by the user through the window).

In some implementations, the rotatable light structure 1002 includes arrays of light-emitting elements 1010 coupled to the auxiliary peripheral members 1011. As shown in FIG. 10, for example, the rotatable light structure 1002 includes three arrays of light-emitting elements positioned on three auxiliary peripheral members 1011. In other implementations, the rotatable light structure 1002 includes a different configuration of arrays. For example, in some implementations, the rotatable light structure 1002 includes a cylindrical structure positioned "below" or "behind" the reel peripheral member 1001. An example cylindrical structure 1020, which may be used instead of or in addition to the three discrete auxiliary peripheral members 1011, is shown in FIG. 10 in broken lines. In some implementations, the cylindrical structure 1020 includes light arrays thereon. In some cases, a plurality of light emitting elements are distributed about the cylindrical structure 1020 to form a continuous grid or grid-like pattern extending around the cylindrical structure.

In some implementations, the light arrays described with respect to FIG. 10 (including a cylindrical structure with light-emitting elements distributed in a grid or grid-like pattern) produce visual elements while the reel 1000 is rotating and/or while the reel 1000 is stopped. In some implementations, the reel 1000 (and/or the reel peripheral member 1001) is movable so that the underlying rotatable light structure is revealed, at which time the rotatable light structure is activated to produce a visual element (e.g., to produce a reel-spin animation). The rotating light structure is also used, in some implementations, to illuminate the reel peripheral member 1001 (e.g., to illuminate symbols or other graphics). In such cases, the rotating light structure may be rotating or static (e.g., not rotating). In some implementations, the rotating light structure projects visual elements (e.g., animations) onto the reel peripheral member 1001, such that the reel peripheral member 1001 operates as a screen in a rear-projection system.

In some implementations, a slot machine as described herein includes a wireless power transfer system configured to wirelessly provide power to the rotatable light structure 1002 (e.g., for controlling and illuminating the light-emitting elements of the arrays 1010). In such cases, the rotatable light structure 1002 includes a receiver 1012 coupled to the rotatable light structure 1002, as well as a transmitter coupled to a non-rotating part of the slot machine. The wireless power transfer system provides electrical power for the arrays 1010 (via conductors 1008), as well as for a controller 1014.

In some implementations, the controller 1014 includes components such as a processor, memory, wireless communication systems, and other electrical and/or circuit elements for providing the functions of the controller 1014. The controller 1014 is configured to receive information from the slot machine and/or any other suitable device or system, including information about when to display visual elements via the light arrays 1010, what visual elements to display, etc. The controller 1014 also controls the light arrays 1010 (e.g., via conductors 1008) to cause the light-emitting elements to be selectively illuminated, during rotation of the rotatable light structure 1002, to produce the desired visual element (e.g., graphic, animated visual element, etc.).

Figure 11A:
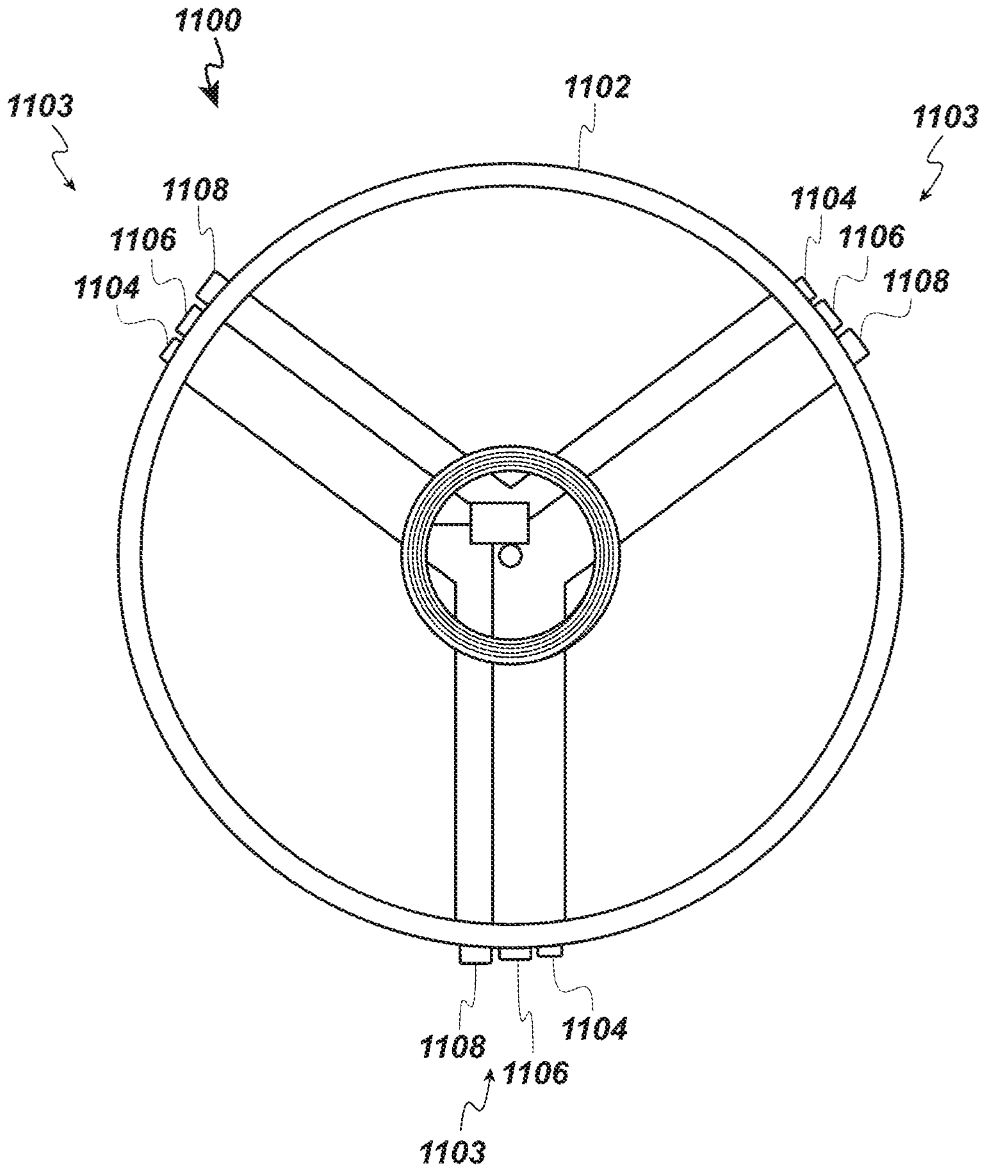
FIG. 11A depicts an example reel with arrays of light-emitting elements, according to some aspects of the present disclosure.

FIG. 11A depicts another example reel 1100 that is used to produce visual elements using a persistence of vision optical technique. The reel 1100 includes a reel peripheral member 1102 that may include symbols thereon. The reel 1100 includes light arrays 1103 that have light-emitting elements at different heights above the reel peripheral member 1102. For example, the light arrays 1103 include a first sub-array 1104 at a first height above the peripheral member 1102, a second sub-array 1106 at a second height above the peripheral member 1102 (different from the first height), and a third sub-array 1108 at a third height above the peripheral member 1102 (different from the first and second heights).

The different heights of the sub-arrays act as a volumetric display, and facilitate the production of volumetric or three-dimensional visual elements by the reel 1100. More particularly, by positioning the sub-arrays at different heights above the reel, different portions of visual elements will appear at different heights above the reel. This may be used to produce various types of effects, such as three-dimensional (e.g., volumetric) images. In some implementations, the three-dimensional images are animated, while in others they are static. As one specific example, the sub-arrays are selectively illuminated to display a three-dimensional image of a reel symbol (e.g., cherries), and the symbol rotates or otherwise moves to produce the appearance of a true three-dimensional object between the user and the surface of the reel (e.g., the reel peripheral member 1102). In some cases, the volumetric display produces animations that appear to move towards and/or away from a user.

Figure 11B:
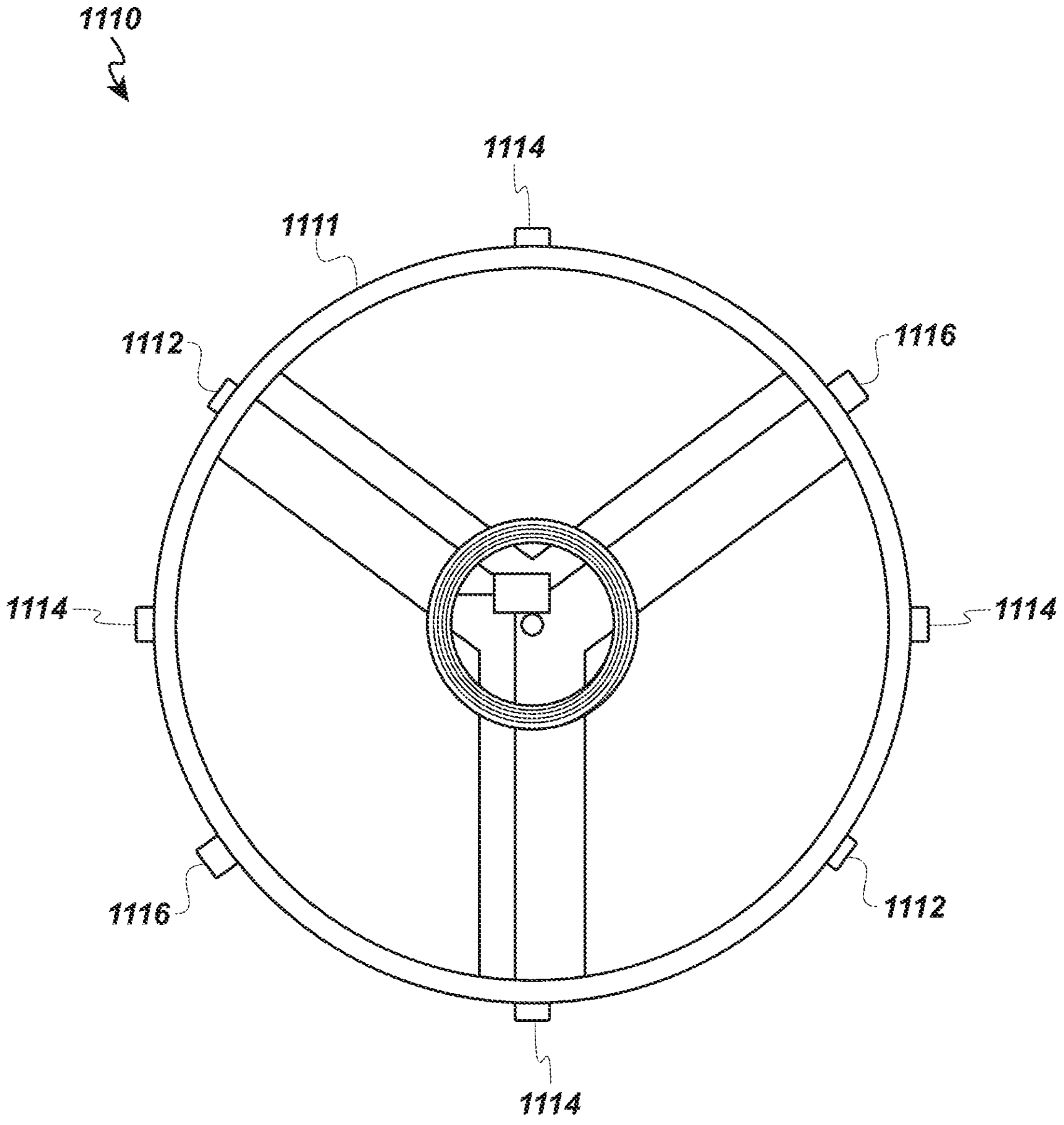
FIG. 11B depicts another example reel with arrays of light-emitting elements, according to some aspects of the present disclosure.

FIG. 11B depicts another example reel 1110 that is used to produce three-dimensional visual elements using a persistence of vision optical technique and light arrays having different heights above the surface of a reel peripheral member 1111. For example, the reel 1110 includes a reel peripheral member 1111 that may include symbols thereon. The reel 1110 includes a set of first light arrays 1112 having a first height above the reel peripheral member 1111, a set of second light arrays 1114 having a second height above the reel peripheral member 1111, and a set of third light arrays 1116 having a third height above the reel peripheral member 1111. In some implementations, the reel 1110 has more light arrays. For example, FIG. 11B illustrates eight light arrays, with the light arrays having one of three different heights above the reel peripheral member 1111. In other implementations, the reel 1110 has, for example, 10, 15, 20, 25, 30, or any other suitable amount of arrays, with the arrays distributed among 3, 4, 5, 6, or more different heights.

In some implementations, light arrays having the same size and/or height are positioned on opposite sides of the reel 1110, such that the reel 1110 is rotationally balanced and does not wobble or vibrate when the reel 1110 spins. FIG. 11B illustrates an example in which the light arrays having the same heights are positioned on opposite sides of the reel. Other examples are also contemplated, including any arrangement of light arrays that results in a rotationally balanced reel.

Figure 11C:
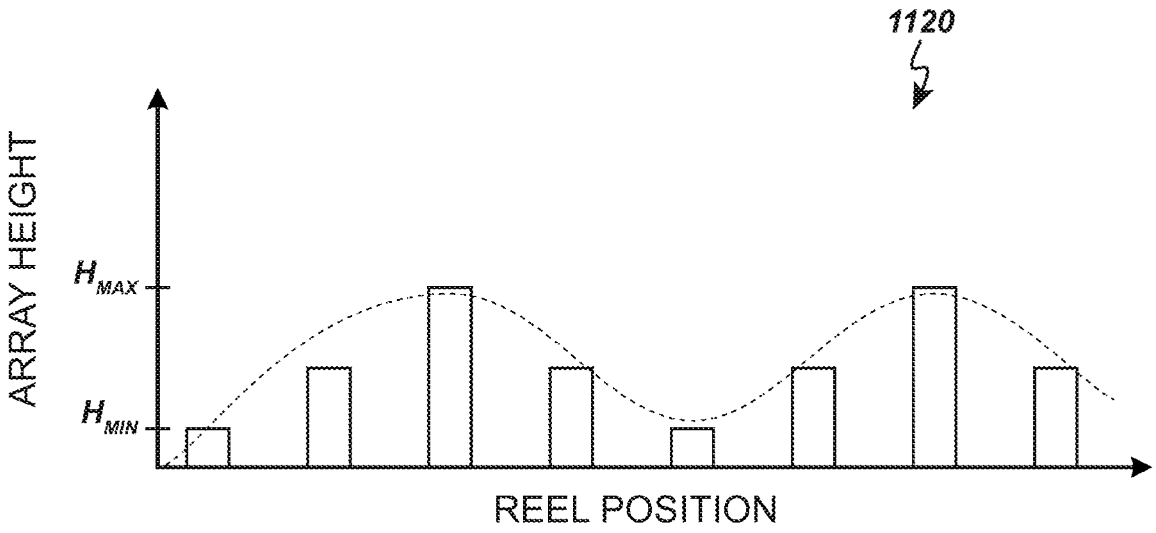
FIG. 11C depicts a graph showing an example height distribution of the arrays of light-emitting elements on the example reel of FIG. 11B.

FIG. 11C illustrates an example distribution 1120 of heights of the light arrays as a function of the position about the circumference of the reel 1110. In this example, the height distribution resembles a sine wave, though other distributions are also possible. In some implementations, the heights of the arrays are distributed between a minimum height $h_{min}$ and a maximum height $h_{max}$. In some implementations, the minimum height is 0.0 mm (e.g., the lowest arrays are flush with the reel peripheral member 1111), and the maximum height is 3.0 mm. Other minimum and maximum heights are also contemplated, such as an $h_{min}$ of 1.0 mm, 2.0 mm, 3.0 mm, or another suitable value, and an $h_{max}$ of 4.0 mm, 5.0 mm, 10.0 mm, or another suitable value. In some implementations, the height span between $h_{min}$ and $h_{max}$ (e.g., the difference in height between $h_{max}$ and $h_{min}$) is 3.0 mm, 4.0 mm, 5.0 mm, 10.0 mm, or any other suitable height span. It will be understood that the height of a given array on a given reel may be based on the number of arrays on that reel, the height span of the arrays, and/or the particular height distribution of that reel.

Each of the reels and rotatable light structures described with respect to FIGS. 7-11C includes one or more motors configured to spin or rotate the reels and/or rotatable light structures. Example motors include, without limitation, stepper motors, servo motors, brushed motors, brushless motors, magnetically driven motors (e.g., permanent magnet motors), hydraulic and/or pneumatic motors, or the like (as well as suitable circuitry and/or components for powering, rotating, or otherwise controlling the motors), and in some cases, gear trains, gear boxes, transmissions, clutches, or the like. The motors may be coupled to the reels and/or the rotatable light structures, to stationary structures of the slot machine, or components of the motors or other driving mechanisms may be physically distributed between rotating and non-rotating structures of the slot machine.

Figure 12:
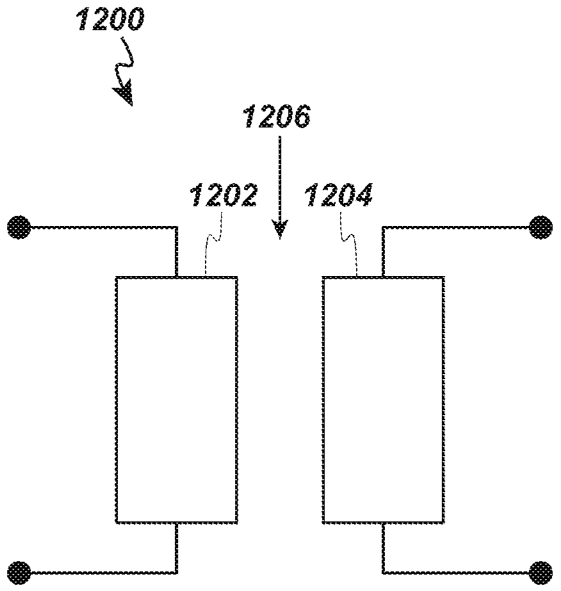
FIG. 12 depicts an example wireless power transfer system for use with a slot machine, according to some aspects of the present disclosure.

FIG. 12 depicts a schematic view of a wireless power transfer system 1200 that is used to wirelessly provide power to a rotating component that includes arrays of light-emitting elements (e.g., the reels 700, 1100, 1110, a rotatable light structure 802, 906, 1002), in some implementations. The wireless power transfer system 1200 includes a transmitter 1202, which is stationary and/or otherwise coupled to a non-rotating component of the slot machine. The wireless power transfer system 1200 further includes a receiver 1204, which is coupled to a reel, a rotatable light structure, or another rotating or non-stationary component of the slot machine. The transmitter 1202 is coupled to a power source (e.g., a battery, a power supply, etc.), and the receiver 1204 is coupled to electrical circuitry on the rotating component (e.g., a controller, the arrays of light-emitting elements, a battery, etc.). In some implementations, the transmitter 1202 and receiver 1204 are conductive coils that inductively (or otherwise) couple to one another across an air gap 1206 (or other space), such that electrical power can be transferred from the transmitter 1202 to the receiver 1204.

Figure 13:
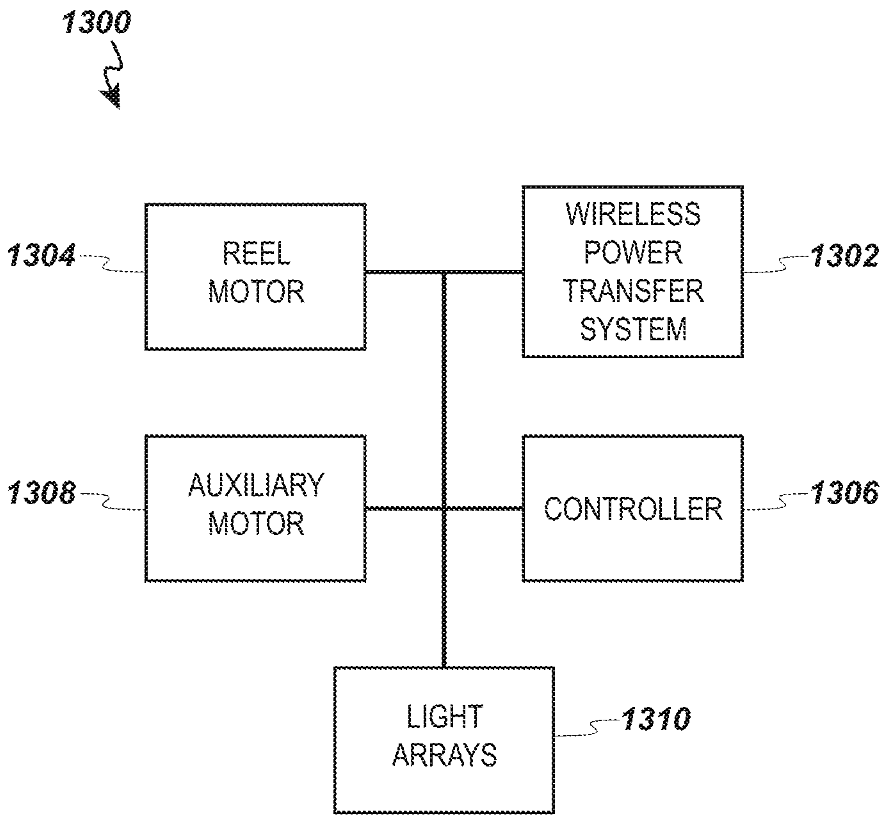
FIG. 13 depicts a schematic illustration of a portion of a slot machine, according to some aspects of the present disclosure.

FIG. 13 depicts a schematic illustration of a portion of a slot machine 1300 that facilitates the production of visual elements using persistence of vision optical techniques. The slot machine 1300 includes a reel motor 1304, which may be a stepper motor, a servo motor, a brushed or brushless motor, a pneumatic motor, or any other suitable motor. The reel motor 1304 is configured to spin a reel during game play of the slot machine 1300.

The slot machine 1300 also includes a wireless power transfer system 1302 (e.g., the wireless power transfer system 1200). The wireless power transfer system 1302 wirelessly provides power to a rotating component that includes light-emitting elements and optionally controllers, batteries, power storage components, wireless communications systems (e.g., WiFi, Bluetooth, etc.), circuitry, and/or other components that are used to produce visual elements using persistence of vision techniques (and/or for performing other operations).

The slot machine 1300 also includes a controller 1306 (e.g., the controllers 714, 814, 914, 1014). The controller 1306 sends and/or receives signals (via a wireless communication system using WiFi, Bluetooth, or the like) from the slot machine 1300 and/or another device or system. In various implementations, signals include programs, code, and/or other information that defines, relates to, or otherwise facilitates production of visual elements via the light arrays (e.g., animations, images, etc.).

The slot machine 1300 also optionally includes an auxiliary motor 1308 for rotating a rotatable light structure (if the slot machine 1300 is so equipped). In some implementations, the auxiliary motor 1308 is a stepper motor, a servo motor, a brushed or brushless motor, a pneumatic motor, galvanometer, or any other suitable motor. In some implementations, the auxiliary motor 1308 is configured to spin a rotatable light structure during game play of the slot machine 1300 to facilitate the production of visual elements (e.g., images, animations, etc.) using persistence of vision optical techniques, as described herein.

The slot machine 1300 also includes light arrays 1310. In some implementations, the light arrays 1310 include light-emitting diodes (LEDs), organic light-emitting diodes (OLEDs), incandescent lights, LED or OLED displays (e.g., pixelated n×m display elements), and/or any other suitable light-emitting element or component. The light arrays 1310 (which may correspond to the light arrays 710, 810, 910, 1010, 1103, 1112, 1114, 1116) are configured to be selectively illuminated by the controller 1306 while a rotating component (e.g., a reel or a rotatable light structure) is rotating to produce a visual element (e.g., animation, image) using a persistence of vision optical technique.

The foregoing discussion describes the use of light arrays to produce images using persistence of vision techniques. Such light arrays are described in various examples as being positioned on a mechanical reel, behind or inside of a mechanical reel, or above a mechanical reel. However, it will be understood that the systems, mechanisms, and techniques described herein may be used in conjunction with any suitable type of reel or reel-display technology. For example, the described light arrays and persistence of vision techniques may be used in conjunction with non-rotating displays (e.g., flat or curved LCD, LED, or OLED displays) that mimic the appearance and/or function of a mechanical reel, rotating reels that incorporate active display components (e.g., reels with LCD, LED, or OLED displays that rotate with the reel), or the like.

Further, while reels and rotating light structures are shown with spokes that support reel peripheral members or auxiliary peripheral members, or the like, the particular number, size, shape, and/or other physical or functional configuration of the spokes is merely an example, and other configurations are also possible. For example, in some implementations, rotating components such as reels and rotatable light structures have two, four, five, six, or more spokes supporting the reel and/or auxiliary peripheral members.

What is claimed is:

1. A system for displaying game outcomes, the system comprising:
- a reel configured to spin in response to an input;
- a rotatable structure comprising an array of light-emitting elements, the rotatable structure configured to oscillate the array of light-emitting elements, wherein the oscillation of the array of light-emitting elements defines an arc at least in part corresponding to a user-viewable area through which a portion of the reel is visible; and
- a controller coupled to the array of light-emitting elements and configured to selectively illuminate respective light-emitting elements of the array of light-emitting elements to produce an animation effect.

2. The system of claim 1, wherein:
- the rotatable structure comprises an auxiliary peripheral member;
- the array of light-emitting elements are coupled to the auxiliary peripheral member; and
- the auxiliary peripheral member is positioned outside of a periphery of the reel and configured to offset the array of light-emitting elements from the periphery of the reel by a distance.

3. The system of claim 2, wherein the distance is between 1 mm and 10 mm.

4. The system of claim 1, comprising a wireless power transfer system configured to wirelessly provide power, via the controller, to the rotatable structure.

5. The system of claim 4, wherein the controller is coupled to the rotatable structure, and further comprising:
- a transmitter coupled to a non-rotating structure of the system; and
- a receiver coupled to the controller and to the rotatable structure.

6. The system of claim 1, wherein the rotatable structure and the reel rotate about the same axis.

7. The system of claim 1, wherein the controller further comprises a wireless communication system configured to receive information from the system about when to display visual elements via the array of light-emitting elements.

8. A gaming device comprising:
- a set of reels configured to rotate about an axis in response to a user input;
- a rotatable structure configured to oscillate a light array, the oscillation of the light array defining an arc at least in part corresponding to a user-viewable area through which a portion of the set of reels is visible, the rotatable structure comprising a conductor configured to provide power to the light array; and
- a controller coupled to the conductor and configured to selectively illuminate light-emitting elements of the light array during rotation of the rotatable structure to produce an animation effect.

9. The gaming device of claim 8, wherein:
- the rotatable structure comprises a spoke; and
- the controller is coupled to the spoke.

10. The gaming device of claim 8, wherein the controller is configured to produce the animation effect by a persistence of vision optical technique while the set of reels are rotating.

11. The gaming device of claim 8, wherein the light array includes a row of discrete tri-color LEDs.

12. The gaming device of claim 8, wherein the animation effect includes displaying symbols associated with a virtual gameplay other than a plurality of symbols of the set of reels.

13. The gaming device of claim 8, wherein the rotatable structure comprises an actuator configured to oscillate the rotatable structure.

14. The gaming device of claim 8, wherein the animation effect is produced by:

when the set of reels are at a first rotational position within a single rotation, illuminating the light array according to a first illumination pattern; and when the set of reels are at a second rotational position within the single rotation, the second rotational position different from the first rotational position:

ceasing to illuminate the light array according to the first illumination pattern; and illuminating the light array according to a second illumination pattern different from the first illumination pattern.

15. The gaming device of claim 8, wherein the controller is configured to produce video-like animation.

16. A gaming system, comprising:

a housing defining a user-viewable area;

a reel positioned within the housing and configured to spin;

a rotatable light structure positioned within the housing and comprising a light array having light-emitting elements, the rotatable light structure configured to rotate the light array through an arc that is less than a full rotation about an axis, at least a part of the arc corresponding to the user-viewable area through which a portion of the reel is visible; and a controller communicatively coupled to the light-emitting elements, the controller configured to selectively illuminate the light-emitting elements while the rotatable light structure is rotating to produce an animated visual element that depicts movement.

17. The gaming system of claim 16, wherein the controller is operable to generate animated light effects over the user-viewable area when the reel is static.

18. The gaming system of claim 16, wherein:

the reel comprises a window; and the light-emitting elements are configured to produce the animated visual element that depicts movement via an illumination pattern illuminated through the window.

19. The gaming system of claim 16, wherein:

the light array is a first light array; and the gaming system further comprises:

a second light array; and a third light array.

20. The gaming system of claim 19, wherein the rotatable light structure comprises a motor configured to rotate the light array.

* * * * *